United States Patent [19]

West, Jr.

[11] Patent Number: 4,692,919

[45] Date of Patent: Sep. 8, 1987

[54] COMMUNICATIONS NETWORK

[75] Inventor: Lamar E. West, Jr., Maysville, Ga.

[73] Assignee: Scientific Atlanta, Inc., Atlanta, Ga.

[21] Appl. No.: 802,488

[22] Filed: Nov. 29, 1985

[51] Int. Cl.$^4$ ............................................... H04J 3/16
[52] U.S. Cl. ................................... 370/96; 340/825.08
[58] Field of Search ....................... 370/96, 90, 13, 17; 340/825.06, 825.08

[56] References Cited

U.S. PATENT DOCUMENTS

| | | | |
|---|---|---|---|
| 4,162,483 | 7/1979 | Entenman ...................... | 340/825.08 |
| 4,435,706 | 3/1984 | Callan ............................. | 340/825.08 |
| 4,586,040 | 4/1986 | Akiba et al. ..................... | 340/825.08 |

Primary Examiner—Douglas W. Olms
Assistant Examiner—Wellington Chin
Attorney, Agent, or Firm—Martin LuKacher

[57] ABSTRACT

In order to prevent a communications failure in a communications network wherein many terminals share a common communications channel or bus and respond to a network controller over the communications bus to enable the terminals to have access to the bus sequentially and for predetermined intervals, the command which enables the terminal to transmit is connected to an "anti-babbling" circuit which processes the enabling command and prevents the terminal from transmitting its local messages onto the bus when the enabling command does not conform to either of two critical communication protocol timing parameters. Thus, if the enabling command extends longer than the predetermined interval, or occurs at a frequency higher than the predetermined frequency required for normal communication, the "anti-babbling" circuit times-out and causes the terminal to stop transmitting. Only the terminal affected by the failure is disabled and the rest of the communications network, including the other terminals, can continue to operate.

9 Claims, 7 Drawing Figures

COMMUNICATIONS NETWORK

DESCRIPTION

The present invention relates to communications networks, and particularly to an improvement in communications networks having a plurality of terminals which share a common communications channel or bus. This improvement will prevent a failure affecting one or more of the terminals from causing breakdown of the entire communications network.

The present invention is especially suitable for use in communications networks having a large number of terminals which receive and transmit messages over common communication channels at predetermined times in sequence when polled by a network controller connected to the channels.

In typical large communications networks having several terminals which share common communication channels, the channel is time multiplexed between the terminals, and each terminal is given access to the channel sequentially and for predetermined intervals of time. If any of the terminals fails in such a way that it continues to try to respond over the channel for a period of time greater than that required for normal network communications, or trys to respond for a period of time within the limits of normal network communications protocol but occuring at a frequency greater than that required for normal network communications protocol, a general failure or "crash" of the network can occur.

It is an object of the present invention to provide improved terminals for use in communications networks, which share a common communications channel, and in which the responding capability of the terminal is limited so as to prevent a general communications failure or crash.

When a terminal transmits onto the communications channel of the network for a period greater than that required for normal network communications protocol or at a frequency greater than that required for normal network communications protocol, it may be referred to as "babbling".

It is another object of the present invention to provide improved terminals for use in networks wherein several terminals share a common communication channel or bus which terminals have an "anti-babbling" circuit which prevents the terminal from being enabled to transmit out of its assigned time slot, even though a command to enable transmission is available in the terminal.

Briefly described, an improved terminal in accordance with the invention may be used in a communications network having a plurality of terminals which transmit and receive messages over a common communications channel for predetermined intervals in a sequence determined by control signals from a network controller which is connected to the channel and enables the terminals to have access to the channel. The improved terminals utilize means responsive to the control signals for providing an enable signal or command. The terminal also has means for transmitting messages local to the terminal (either which are locally generated or are to be relayed by the terminal) onto the channel. Means are provided, responsive to the enable signal, for enabling the means for transmitting the local messages. Means are included in the enable signal responsive means for inhibiting a response to the enable command signal which would have enabled the local transmitter for any period substantially greater than the predetermined interval allowed for that terminal in the sequence and for inhibiting responses to the enable command signals if these signals occur with an allowable period but at freguency greater than the predetermined frequency allowed for that terminal in the sequence. The latter means is preferably provided by an anti-babbling circuit which responds to the enable command signal and produces a pulse for enabling the local transmitter. In case of enable command signal which is present for longer than its assigned interval, or occurs at a frequency higher than that required for normal communication protocol, the anti-babbling circuit produces a time out which precludes the enabling pulse from being presented to the local transmitter of the terminal in a manner that does not follow the predetermined protocol assigned to it in each sequence.

The foregoing and other objects, features and advantages of the invention will become more apparent from a reading of the following description in connection with the accompanying drawings in which.

Figure 1:
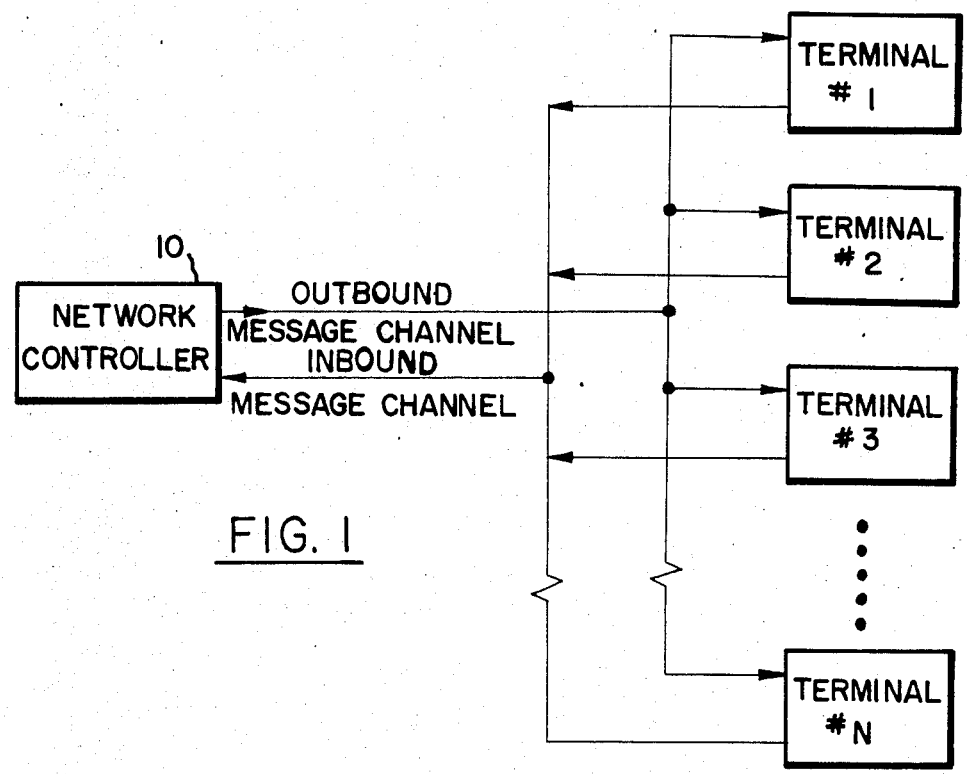
FIG. 1 is a block diagram of a communications network in which the invention is utilized.

Referring to FIG. 1, there is shown a communications network where several terminals indicated as terminals #1, #2, #3 . . . #N share a common communications channel, indicated as an outbound message channel over which signals are received from a network controller 10 and an inbound message channel in which local messages generated at the terminals are transmitted to the controller. The terminals can talk to each other through the controller.

Figure 2:
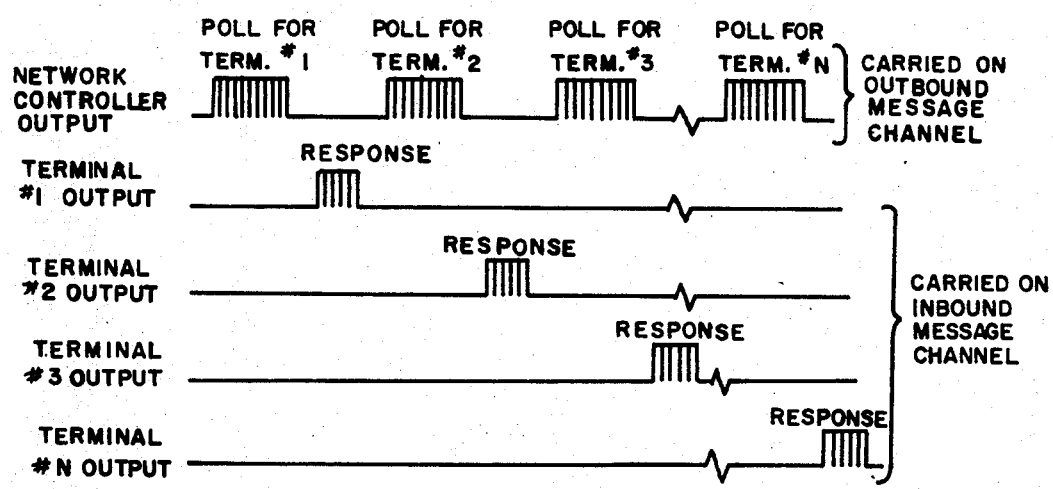
FIG. 2 is a series of wave forms illustrating the operation of the system shown in FIG. 1.

As shown in FIG. 2, the network controller 10 systematically polls each terminal individually. Each terminal has a unique address which may be a digital signal represented by pulses or the absence of pulses during the polling times. The polling takes place over the outbound message channel and the unique addresses for each terminal are transmitted by the network controller 10 sequentially as shown in the uppermost line of FIG. 2. The terminal corresponding to the address in the poll responds using the inbound message channel. The response times are shown between the polling times for each of the N terminals in FIG. 2. After the first terminal responds, the controller accesses the next terminal in the polling sequence and so forth until all N terminals are given access to the communications channel. Then the sequence repeats.

The communications channels may be any conventional communication link, for example hard wire lines, a radio link, a fiber optic link or any other type of communication media. Instead of separate outbound and inbound message channels, a single channel may be used and carry both the inbound and outbound messages multiplexed in separate time slots during each sequence. In the illustrated system, all of the terminals share common outbound and inbound channels. The network controller 10 is the only device that places information on the outbound channel. Therefore, there is no chance for a conflict in this channel. However, a multiplicity of terminals time share the inbound message channel. During normal operation each terminal will respond only after it has been addressed by the network controller in its assigned interval in the sequence.

A failure or crash can occur affecting the entire network, if any one terminal attempts to respond at the wrong time. This will tie up the inbound channel, making it impossible for the network controller to receive messages from the other terminals.

Figure 3:
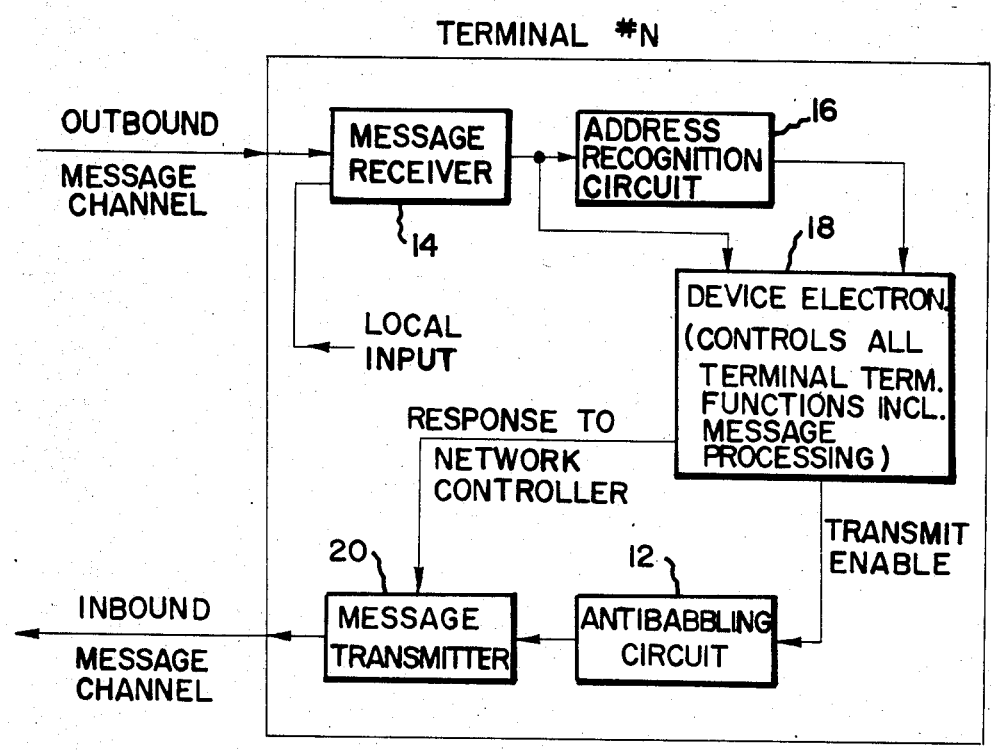
FIG. 3 is a block diagram of one of the terminals of the network shown in FIG. 1.

In order to prevent such failures an anti-babbling circuit 12 is utilized in each of the terminals. Terminal #N is illustrative of each terminal and is illustrated in FIG. 3. The polls from the network controller are first received from the outbound message channel by a message receiver 14. The message receiver 14 then passes the message along to the address recognition circuit 16 wherein the poll is compared with the address for the terminal. If the poll matches, this indicates that the message from the controller is intended for this #N terminal and not the other terminals in the network.

The device electronics 18 for the terminal may be a microprocessor which controls all of the terminal functions including processing of the received messages and local input messages, both of which are transmitted to the inbound message channel by a message transmitter 20. The messages which are to be transmitted are labeled as the response to network controller in FIG. 3. The message transmitter 20 will not transmit a message unless it gets a transmit enable command signal from the device electronics 18. It will be apparent that the network and the terminal, as so far described is essentially conventional. The improvement in the network arises out of the use of the anti-babbling circuit 12 through which the transmit enable command is passed.

Figure 5:
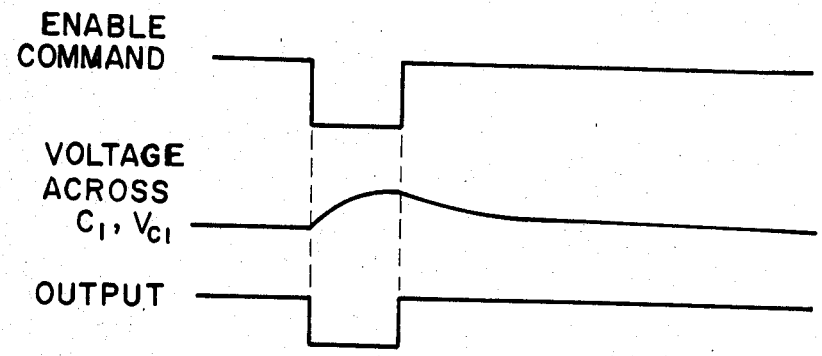
FIGS. 5, 6 and 7 show the responses of the anti-babbling circuit to different enable command signals.
Figure 6:
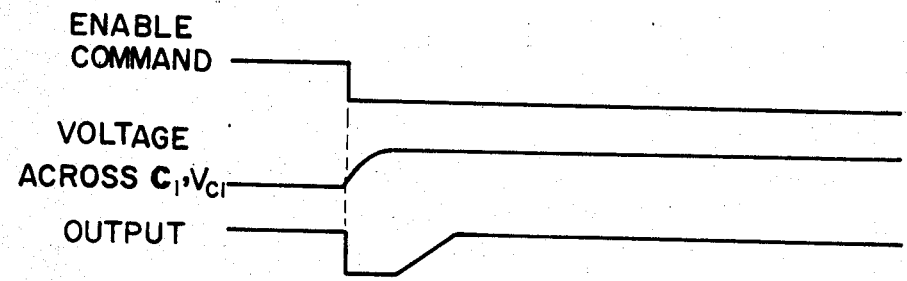
Figure 7:
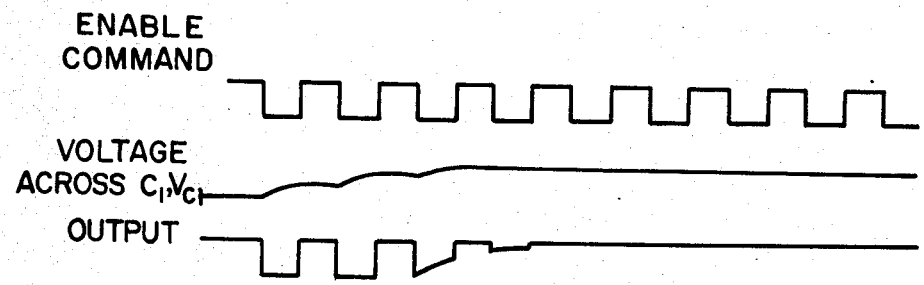

During normal operation the anti-babbling circuit 12 passes this enable command signal along and enables the message transmitter which in turn sends the message to the network controller 10 over the inbound message channel. The enable command may be of proper duration as shown in FIG. 5. There are two principal failure modes in the terminal and network controller which result in an enable command which persists for a long period of time as shown in FIG. 6 or goes on and off for a prolonged period of time as shown in FIG. 7. The enable commands in FIGS. 5, 6 and 7 are shown as a TTL low level output when the command is on.

Figure 4:
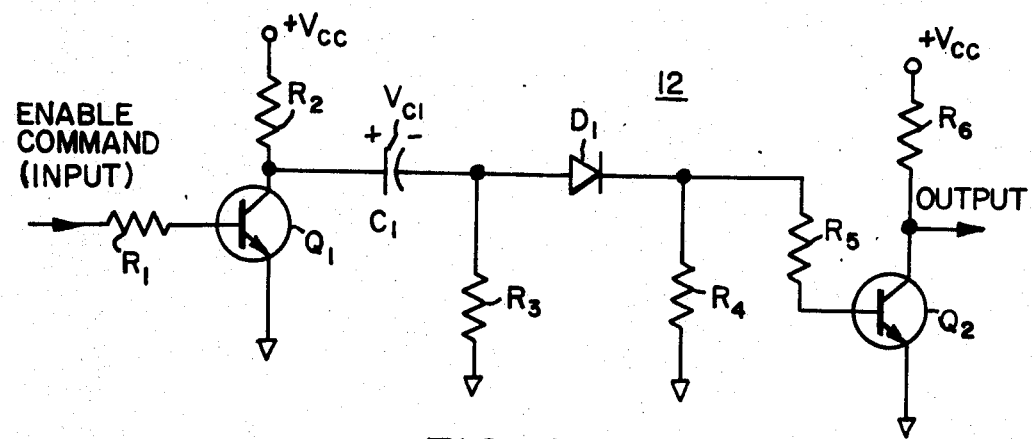
FIG. 4 is a simplified schematic diagram of one possible realization of the anti-babbling circuit shown in FIG. 3.

The output is high when the command is off or absent. The anti-babbling circuit which is provided in accordance with the presently preferred embodiment of the invention is shown in FIG. 4. The circuit is operative to produce an enabling pulse which is indicated as the output in FIGS. 5, 6 and 7. This circuit provides a time-out, which controls the duration of enable output pulses which go to the message transmitter 20, and prevent the message transmitter 20 from being on for more than a "time-out" period. This period starts with the leading edge of the enable command signal and is greater than the predetermined interval or access time allocated to the terminal for its use of the inbound message channel. Thus if the response of the device electronics 18 to the network controller results in an enable command that is longer than the time for normal communications, such that babbling would occur, the anti-babbling circuit causes its enable output pulse to time out. This terminates communications from the terminal and frees the channel for use by another terminal.

Also, if another response is demanded (the time between enable commands is shorter than dictated by the polling sequence—see FIG. 2), the anti-babbling circuit will also cause the enable output pulse to time out. The latter case is illustrated in FIG. 7 and will be described hereinafter. Referring to FIG. 4, the circuit 12 has an input transistor stage Q1 and an output transistor stage Q2. The transistors are shown as NPN transistors. It will be appreciated that PNP or field effect transistors may be used, in which case the polarities of the operating voltages and which of the collector or emitter is connected to return or to a source of voltage which is relatively positive with respect to return, will be reversed. The time out is provided by a capacitive-resistive circuit including the capacitor C1 and a $\pi$ (PI) resistive network including a diode D1 at the top of the PI and resistors R3 and R4 as the legs of the PI. A resistor R2 is connected between the operating voltage source shown at Vcc which is connected to the collector of the transistor Q1. The output stage transistor Q2 is connected as a grounded emitter stage. The input and output stages, the resisitive network and the Vcc source, share a common return shown as ground.

When a normal duration enable command signal, as shown in FIG. 5, is applied, the voltage across C1 does not have a chance to charge entirely through the resistor R2 and the enable command signal is passed through the circuit and appears at the output at the collector of transistor Q2. If the enable command goes low and stays low continuously, Q2 will be driven to cut off for a sufficient period of time to allow C1 to charge. The charging time of C1 and the time out of the circuit is controlled by the capacitance of the capacitor C1 and the resistance presented by the resistors R2, R3, R4, R5 and the equivalent resistances presented by the diode D1 and transistor Q2. After the enable command signal is terminated, the capacitor C1 discharges through the resistor R3, diode D1 being reverse biased. This discharge time is set so as to require a minimum delay between successive enable command signals. Thus, as shown in FIG. 6 if the enable command signal goes low and stays low, the circuit 12 causes the output to time out the terminal then is disabled, but the entire network remains operative.

If the device electronics 18 responds too often, as can occur because of an error in the address recognition circuit 16, the enable command signal occurs too often, as shown in FIG. 7. In such a case the voltage across the capacitor will eventually rise as it charges and the anti-babbling circuit will cause the output to time out. The period between enable commands to determine how long the time out will take is determined by the relationship of the resistance of R4 and R3. R4 is chosen much smaller than R3, then the discharging time of C1 is much longer than the charge time. Each enable pulse tends to charge C1. If there is not enough delay time between the enable command signal pulses, C1 will eventually charge (by charge is meant that the terminal of C1 which is connected to R3 goes negative with respect to the terminal of C1 connected to R2 as shown in FIGS. 5, 6 and 7). The circuit then times out and the enabling output pulse which appears at the collector of Q2 goes positive.

From the foregoing description it will be apparent that an improved communications network which is guarded against "crashes" due to failures which would cause babbling from a terminal in the network is obviated. Variations and modifications of the herein described network and circuitry, within the scope of the invention, will undoubtedly suggest themselves to those skilled in the art. Accordingly, the foregoing description should be taken as illustrative and not in a limiting sense.

I claim:

1. In a communications network having a plurality of terminals which transmit and receive messages over a common communication channel for predetermined intervals and with a predetermined frequency in a sequence determined by control signals from a controller which is connected to the common channel and enables said terminals to have access to said channel, an improved terminal which comprises means responsive to said control signals for providing an enable signal, means for transmitting messages local to said terminal onto said channel, means responsive to said enable signal for enabling said means for transmitting its local messages, and means included in said last named means for inhibiting a response to said enable signal which would enable said means for transmitting its local messages for a period substantially greater than the predetermined interval in each said sequence or at a frequency substantially greater than the predetermined frequency in each said sequence.

2. The invention in accordance with claim 1 wherein said means responsive to said enable signal comprises means operated by said enable signal for producing an enabling pulse which times out at the end of said period notwithstanding that said enable signal is present during an interval longer than said period or for producing said enabling pulse as a series of enabling pulses which discontinue if the frequency of said enabling pulses exceeds said frequency and for applying said enabling pulse to said means for transmitting messages local to said terminal.

3. The invention according to claim 2 wherein said means operated by said enable signal includes a circuit having capacitance and resistance for establishing the period of said time out.

4. The invention according to claim 3 wherein said circuit includes input and output stages having said circuit connected therebetween, said enable signal being applied to said input stage and said enabling signal being produced by said output stage.

5. The invention as set forth in claim 1 wherein said input stage is a transistor amplifier having a base, collector and emitter, said enable signal being applied to said base, said output stage including a transistor having base emitter and collector, said capacitance being provided by a capacitor connected to one of said input stage transistor's collector and emitter, and a resistive network connecting said capacitor to the base of said output stage transistor, one of said output stage transistor's collector and emitter providing said enabling pulse, and the other of said input stage transistor's emitter and collector, the other of said output stage transistor's emitter and collector and said resistive network being connected to a common return.

6. The invention according to claim 5 wherein said resistive network is a PI network including a diode connected between said capacitor and said output stage transistor base and providing the top of said PI network and a pair of resistors connected between opposite sides of said diode and return providing the legs of said PI network.

7. The invention according to claim 6 wherein a resistor is connected between said one of said emitter and collector of said input stage transistor and a source of operating voltage.

8. The invention according to claim 7 wherein the emitter of said input and output stage transistors are connected to return and said transistors are of the NPN type.

9. The invention according to claim 7 wherein the resistor of one of the legs of said PI network which is connected to said capacitor has a higher value of resistance than the resistor providing the other leg of said PI network.

* * * * *